United States Patent
Flinsbaugh et al.

(10) Patent No.: US 9,760,304 B2
(45) Date of Patent: Sep. 12, 2017

(54) HIGH PERFORMANCE SYSTEM FOR SELECTIVE MERGING OF DATAFRAME SEGMENTS

(71) Applicants: Western Digital Technologies, Inc., Irvine, CA (US); Skyera, LLC, San Jose, CA (US)

(72) Inventors: Jack W. Flinsbaugh, Irvine, CA (US); Justin Jones, Irvine, CA (US); Rodney N. Mullendore, San Jose, CA (US); Andrew J. Tomlin, Irvine, CA (US)

(73) Assignees: Western Digital Technologies, Inc., San Jose, CA (US); Skyera, LLC, San Jose, CA (US)

( * ) Notice: Subject to any disclaimer, the term of this patent is extended or adjusted under 35 U.S.C. 154(b) by 0 days.

(21) Appl. No.: 14/988,440

(22) Filed: Jan. 5, 2016

(65) Prior Publication Data
US 2016/0132248 A1 May 12, 2016

Related U.S. Application Data

(62) Division of application No. 14/020,653, filed on Sep. 6, 2013, now Pat. No. 9,304,709.

(51) Int. Cl.
G06F 12/00 (2006.01)
G06F 3/06 (2006.01)
G06F 12/02 (2006.01)

(52) U.S. Cl.
CPC .......... *G06F 3/064* (2013.01); *G06F 3/06* (2013.01); *G06F 3/061* (2013.01); *G06F 3/0604* (2013.01);
(Continued)

(58) Field of Classification Search
None
See application file for complete search history.

(56) References Cited

U.S. PATENT DOCUMENTS 5,008,886 A 4/1991 Chinnaswamy et al.
5,477,541 A 12/1995 White et al.
(Continued)

FOREIGN PATENT DOCUMENTS

WO WO-2006/062511 A1 6/2006

OTHER PUBLICATIONS

Gilbert, Douglas. "sg.sub.--write.sub.--same(8)--Linux man p." 2009. retrieved from http://linux.die.net/man/8/sg.sub.--write.sub.--same.

(Continued)

*Primary Examiner* — Daniel Tsui
(74) *Attorney, Agent, or Firm* — McDermott Will & Emery LLP

(57) ABSTRACT

A method of writing data to a range of logical blocks in a storage medium includes: receiving a command including a starting logical block address, a value indicating a range of logical block addresses to be written, and a logical block of data; storing the logical block in a first temporary storage; generating a logical page by duplicating the logical block a plurality of times corresponding to a number of logical blocks in a logical page and transporting the generated logical page to a second temporary storage and storing the generated logical page in the second temporary storage; writing the generated logical page from the second temporary storage into the storage medium beginning from the starting logical block address; and performing a read-modify-write operation if the first write operation does not begin on a logical page boundary or the last write operation does not end on a logical page boundary.

17 Claims, 6 Drawing Sheets

(52) U.S. Cl.
CPC .......... *G06F 3/0656* (2013.01); *G06F 3/0661* (2013.01); *G06F 3/0673* (2013.01); *G06F 3/0679* (2013.01); *G06F 12/0246* (2013.01)

(56) References Cited

U.S. PATENT DOCUMENTS

| | | | |
|---|---|---|---|
| 5,778,013 A | 7/1998 | Jedwab | |
| 6,856,556 B1 | 2/2005 | Hajeck | |
| 7,126,857 B2 | 10/2006 | Hajeck | |
| 7,171,604 B2 | 1/2007 | Sydir et al. | |
| 7,203,890 B1 | 4/2007 | Normoyle | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,870,350 B1 * | 1/2011 | Yu .......................... | G06F 13/161 711/154 |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,108,692 B1 | 1/2012 | Merry et al. | |
| 8,108,753 B2 | 1/2012 | Anderson et al. | |
| 8,112,595 B1 | 2/2012 | Bar-El | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,200,890 B2 | 6/2012 | Terasaki et al. | |
| 8,243,525 B1 | 8/2012 | Kan | |
| 8,250,320 B1 | 8/2012 | Bar-El | |
| 8,254,172 B1 | 8/2012 | Kan | |
| 8,261,012 B2 | 9/2012 | Kan | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,423,722 B1 | 4/2013 | Deforest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey, III et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,549,236 B2 | 10/2013 | Diggs et al. | |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu et al. | |
| 8,612,804 B1 | 12/2013 | Kang et al. | |
| 8,615,681 B2 | 12/2013 | Horn | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,713,066 B1 | 4/2014 | Lo et al. | |
| 8,713,357 B1 | 4/2014 | Jean et al. | |
| 8,719,531 B2 | 5/2014 | Strange et al. | |
| 8,724,422 B1 | 5/2014 | Agness et al. | |
| 8,725,931 B1 | 5/2014 | Kang | |
| 8,745,277 B2 | 6/2014 | Kan | |
| 8,751,728 B1 | 6/2014 | Syu et al. | |
| 8,769,190 B1 | 7/2014 | Syu et al. | |
| 8,769,232 B2 | 7/2014 | Suryabudi et al. | |
| 8,775,720 B1 | 7/2014 | Meyer et al. | |
| 8,782,327 B1 | 7/2014 | Kang et al. | |
| 8,788,778 B1 | 7/2014 | Boyle | |
| 8,788,779 B1 | 7/2014 | Horn | |
| 8,788,880 B1 | 7/2014 | Gosla et al. | |
| 8,793,429 B1 | 7/2014 | Call et al. | |
| 9,304,709 B2 | 4/2016 | Flinsbaugh et al. | |
| 2007/0101032 A1 | 5/2007 | Nara | |
| 2007/0189137 A1 | 8/2007 | Saito et al. | |
| 2008/0109617 A1 | 5/2008 | Forrer, Jr. et al. | |
| 2008/0209141 A1 | 8/2008 | Perego et al. | |
| 2008/0215829 A1 | 9/2008 | Lin et al. | |
| 2008/0270712 A1 | 10/2008 | Hwang et al. | |
| 2008/0282044 A1 | 11/2008 | Kimura et al. | |
| 2008/0320252 A1 | 12/2008 | Jansen et al. | |
| 2008/0320253 A1 | 12/2008 | Tomlin et al. | |
| 2009/0024807 A1 | 1/2009 | Hillier, III et al. | |
| 2009/0024808 A1 | 1/2009 | Hillier, III et al. | |
| 2009/0063792 A1 | 3/2009 | Terauchi | |
| 2009/0089518 A1 | 4/2009 | Hobbet et al. | |
| 2009/0100235 A1 | 4/2009 | Fukuguchi | |
| 2009/0106512 A1 | 4/2009 | Jones et al. | |
| 2009/0132772 A1 | 5/2009 | Zhuang et al. | |
| 2009/0138672 A1 | 5/2009 | Katsuragi et al. | |
| 2009/0150624 A1 | 6/2009 | Resnick | |
| 2009/0172257 A1 | 7/2009 | Prins et al. | |
| 2009/0177850 A1 | 7/2009 | Boyd | |
| 2009/0216966 A1 | 8/2009 | Shum | |
| 2009/0240900 A1 | 9/2009 | Sosogi | |
| 2009/0240901 A1 | 9/2009 | Nakamura | |
| 2009/0276587 A1 | 11/2009 | Moyer | |
| 2009/0287890 A1 | 11/2009 | Bolosky | |
| 2009/0287891 A1 | 11/2009 | Nakano | |
| 2009/0300297 A1 | 12/2009 | Ikeuchi et al. | |
| 2009/0319731 A1 | 12/2009 | Kirihata | |
| 2010/0005253 A1 | 1/2010 | Lee et al. | |
| 2010/0017571 A1 | 1/2010 | Nakaji et al. | |
| 2010/0030978 A1 | 2/2010 | Hada et al. | |
| 2010/0058005 A1 | 3/2010 | Matumura et al. | |
| 2010/0077159 A1 | 3/2010 | Jin | |
| 2010/0079904 A1 | 4/2010 | Sato | |
| 2010/0082889 A1 | 4/2010 | Terasaki et al. | |
| 2010/0100694 A1 | 4/2010 | Hwang | |
| 2010/0122047 A1 | 5/2010 | Vasilievna | |
| 2010/0131725 A1 | 5/2010 | Perego | |
| 2010/0169587 A1 | 7/2010 | Atluri | |
| 2010/0174849 A1 | 7/2010 | Walston et al. | |
| 2010/0174877 A1 | 7/2010 | Yagihashi | |
| 2010/0250793 A1 | 9/2010 | Syu | |
| 2010/0250850 A1 * | 9/2010 | Yang .................. | G06F 9/30043 711/118 |
| 2010/0250874 A1 | 9/2010 | Farrell | |
| 2010/0250875 A1 | 9/2010 | Leung et al. | |
| 2010/0268901 A1 | 10/2010 | Shaeffer | |
| 2010/0312975 A1 | 12/2010 | Rostedt | |
| 2010/0318753 A1 | 12/2010 | Lai et al. | |
| 2011/0022809 A1 | 1/2011 | Satoh et al. | |
| 2011/0035560 A1 | 2/2011 | Bodrozic et al. | |
| 2011/0060887 A1 | 3/2011 | Thatcher et al. | |
| 2011/0072222 A1 | 3/2011 | Wagner et al. | |
| 2011/0078392 A1 | 3/2011 | Chiras et al. | |
| 2011/0078393 A1 | 3/2011 | Lin | |
| 2011/0099323 A1 | 4/2011 | Syu | |
| 2011/0099341 A1 | 4/2011 | Resnick | |
| 2011/0153962 A1 | 6/2011 | Ozceri et al. | |
| 2011/0179237 A1 | 7/2011 | Lee et al. | |
| 2011/0197036 A1 | 8/2011 | Ishii | |
| 2011/0208925 A1 | 8/2011 | Ajanovic et al. | |

(56) References Cited

U.S. PATENT DOCUMENTS

| | | |
|---|---|---|
| 2011/0225378 A1 | 9/2011 | Hara |
| 2011/0231621 A1 | 9/2011 | Liang |
| 2011/0231622 A1 | 9/2011 | Kawamura |
| 2011/0271066 A1 | 11/2011 | Ninomiya |
| 2011/0283049 A1 | 11/2011 | Kang et al. |
| 2011/0296120 A1 | 12/2011 | Khan |
| 2011/0296121 A1 | 12/2011 | Lee |
| 2011/0302378 A1 | 12/2011 | Siebert |
| 2011/0302379 A1 | 12/2011 | Ohmori |
| 2012/0011335 A1 | 1/2012 | Asnaashari |
| 2012/0089793 A1 | 4/2012 | Nazar et al. |
| 2012/0102278 A1 | 4/2012 | Joffray et al. |
| 2012/0117443 A1 | 5/2012 | Lee et al. |
| 2012/0144134 A1 | 6/2012 | Niwa |
| 2012/0221809 A1 | 8/2012 | Yoshikawa et al. |
| 2012/0239869 A1 | 9/2012 | Chiueh |
| 2012/0254562 A1 | 10/2012 | Morrison |
| 2012/0254563 A1 | 10/2012 | Ajanovic |
| 2012/0260020 A1 | 10/2012 | Suryabudi et al. |
| 2012/0265953 A1 | 10/2012 | Matsuzaki et al. |
| 2012/0278531 A1 | 11/2012 | Horn |
| 2012/0278564 A1 | 11/2012 | Goss et al. |
| 2012/0284460 A1 | 11/2012 | Guda |
| 2012/0284587 A1 | 11/2012 | Yu et al. |
| 2012/0311276 A1 | 12/2012 | Dondini et al. |
| 2012/0324179 A1 | 12/2012 | Farrell et al. |
| 2012/0324180 A1 | 12/2012 | Asnaashari et al. |
| 2012/0324191 A1 | 12/2012 | Strange et al. |
| 2013/0046941 A1 | 2/2013 | Ma et al. |
| 2013/0054905 A1 | 2/2013 | Porzio et al. |
| 2013/0061011 A1 | 3/2013 | Woo et al. |
| 2013/0067178 A1 | 3/2013 | Szegedi et al. |
| 2013/0132638 A1 | 5/2013 | Horn et al. |
| 2013/0145106 A1 | 6/2013 | Kan |
| 2013/0166857 A1 | 6/2013 | Kawano et al. |
| 2013/0191594 A1 | 7/2013 | Cleveland |
| 2013/0246721 A1 | 9/2013 | Fukutomi |
| 2013/0254498 A1 | 9/2013 | Adachi |
| 2013/0262795 A1 | 10/2013 | Aono |
| 2013/0282993 A1 | 10/2013 | Nakanishi |
| 2013/0290654 A1 | 10/2013 | Sato |
| 2013/0290793 A1 | 10/2013 | Booth et al. |
| 2013/0326165 A1 | 12/2013 | Chang |
| 2013/0339637 A1 | 12/2013 | Ishii et al. |
| 2014/0006730 A1 | 1/2014 | Zain et al. |
| 2014/0006731 A1 | 1/2014 | Uluski et al. |
| 2014/0025906 A1 | 1/2014 | Das Purkayastha |
| 2014/0059405 A1 | 2/2014 | Syu et al. |
| 2014/0068203 A1 | 3/2014 | Son et al. |
| 2014/0075135 A1 | 3/2014 | Choi et al. |
| 2014/0101369 A1 | 4/2014 | Tomlin et al. |
| 2014/0108749 A1 | 4/2014 | Sato et al. |
| 2014/0115427 A1 | 4/2014 | Lu |
| 2014/0122814 A1 | 5/2014 | Mirichigni et al. |
| 2014/0129785 A1 | 5/2014 | Deetz et al. |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0177362 A1* | 6/2014 | O'Connor ........... G06F 11/1052 365/201 |

OTHER PUBLICATIONS

JEDEC Solid State Technology Association, "Measurement and Reporting of Alpha Particle and Terrestrial Cosmic Ray-Induced Soft Errors in Semiconductor Devices," JESD89A, Oct. 2006, pp. 1-94.

Aeonx, et al., "Single event upset," retrieved from http://en.wikipedia.og/w/index.php?oldid=514476531, revised Sep. 25, 2012, pp. 1-5.

Agrawal, et al., "Design Tradeoffs for SSD Performance," ATC'08 USENIX 2008 Annual Technical Conference on Annual Technical Conference, pp. 57-70.

"Intel Solid-State Drive Optimizer", published by the Intel Corporation, 2009, pp. 1-8.

International Search Report and Written Opinion dated Dec. 11, 2014 from related PCT Serial No. PCT/US2014/054426, 15 pages.

Partial Supplementary European Search Report from European Application No. 14849803.3 dated Mar. 14, 2017.

Extended European Search Report from European Patent Application No. 14849803.3, dated Aug. 1, 2017.

\* cited by examiner

| BIT | 0 | 1 | 2 | 3 | 4 | 5 | ... | 2046 | 2047 |
|---|---|---|---|---|---|---|---|---|---|
| WRITE MASK | 1 | 0 | 1 | 1 | 0 | 0 | ... | 1 | 0 |
| LBA | 8 | 9 | 10 | 11 | 12 | 13 | | 2054 | 2055 |

FIG. 5A

| | | | | | | | | |
|---|---|---|---|---|---|---|---|---|
| MASK PORTION 1 | LBA 8 | LBA 9 | LBA 10 | LBA 11 | LBA 12 | LBA 13 | LBA 14 | LBA 15 |
| MASK PORTION 2 | LBA 16 | LBA 17 | LBA 18 | LBA 19 | LBA 20 | LBA 21 | LBA 22 | LBA 23 |
| ⋮ | | | | | | | | |
| MASK PORTION 256 | LBA 2048 | LBA 2049 | LBA 2050 | LBA 2051 | LBA 2052 | LBA 2053 | LBA 2054 | LBA 2055 |

FIG. 5B

HIGH PERFORMANCE SYSTEM FOR SELECTIVE MERGING OF DATAFRAME SEGMENTS

CROSS-REFERENCE TO RELATED APPLICATION

This application is a divisional application of U.S. application Ser. No. 14/020,653, filed Sep. 6, 2013, entitled "HIGH PERFORMANCE SYSTEM PROVIDING SELECTIVE MERGING OF DATAFRAME SEGMENTS IN HARDWARE," which is expressly incorporated herein by reference in its entirety.

BACKGROUND

Technical Field

This disclosure relates to data storage systems for computer systems. More particularly, the disclosure relates to writing selected data to a storage medium.

Related Art

Data storage systems provide storage for data of a host system. Data is grouped for storage in units of predetermined size referred to as logical blocks which are written to storage media. When writing the logical blocks of data to storage media, for example, in a solid state drive (SSD) or hybrid drive, data may be written in larger units, for example logical pages (L-pages), made up of a plurality of logical blocks. At times it becomes advantageous to write the same new data in a large number of logical blocks spanning several logical pages in the storage medium, or to write new different data to only some of the logical blocks included in a logical page in the storage medium.

BRIEF DESCRIPTION OF THE DRAWINGS

Aspects and features of the present inventive concept will be more apparent by describing example embodiments with reference to the accompanying drawings, in which:

FIG. 5A is a diagram illustrating a write mask according to an example embodiment of the present inventive concept;

FIG. 5B is a diagram illustrating a write mask divided into portions corresponding to a number of logical blocks contained in a logical page according to an example embodiment of the present inventive concept.

DETAILED DESCRIPTION

While certain embodiments are described, these embodiments are presented by way of example only, and are not intended to limit the scope of protection. The methods and apparatuses described herein may be embodied in a variety of other forms. Furthermore, various omissions, substitutions, and changes in the form of the example methods and apparatuses described herein may be made without departing from the scope of protection.

Overview

Solid state drives (SSDs) are employed as data storage systems for computer systems. To modify data stored in a memory location of such a data storage system, data may be written in larger units, for example logical pages, made up of a plurality of logical blocks. For example, a 4 kilobyte (kB) logical page may consist of eight 512 byte logical blocks. At times it becomes advantageous to write identical data into a range of consecutive logical blocks or to modify data in nonconsecutive logical blocks within a range of consecutive logical blocks.

System Overview

One aspect of the present inventive concept is directed to a Write Same apparatus and method which writes the same data into a sequential plurality of logical blocks. In one example embodiment of the Write Same apparatus, the apparatus receives a command including a starting logical block address (LBA), a range of LBA's (i.e., a value indicating the number of logical blocks into which data is to be written), and a block of data to be written into the logical blocks.

The Write Same apparatus operates to write the received block of data into each logical block in the specified range of LBA's beginning at the starting LBA. The Write Same apparatus performs a read-modify-write operation (RMW) if the first write operation does not begin on a logical page boundary or the last write operation does not end on a logical page boundary, merging logical page blocks on-the-fly and performing the appropriate bit-modifications.

Another aspect of the present inventive concept is directed to a Skip Write apparatus and method. In one example embodiment of the Skip Write apparatus, the apparatus receives a command including a starting logical block address, a value indicating a range of logical block addresses, and a write mask. Output logical pages are generated by merging logical blocks into logical pages based on corresponding portions of the write mask.

The Skip Write apparatus operates on the logical pages as determined by a write mask, applying hardware optimization to what were formerly software processes. The Skip Write apparatus merges logical page blocks on-the-fly and performs the appropriate bit-modifications based on the write mask.

Write Same

Figure 1:
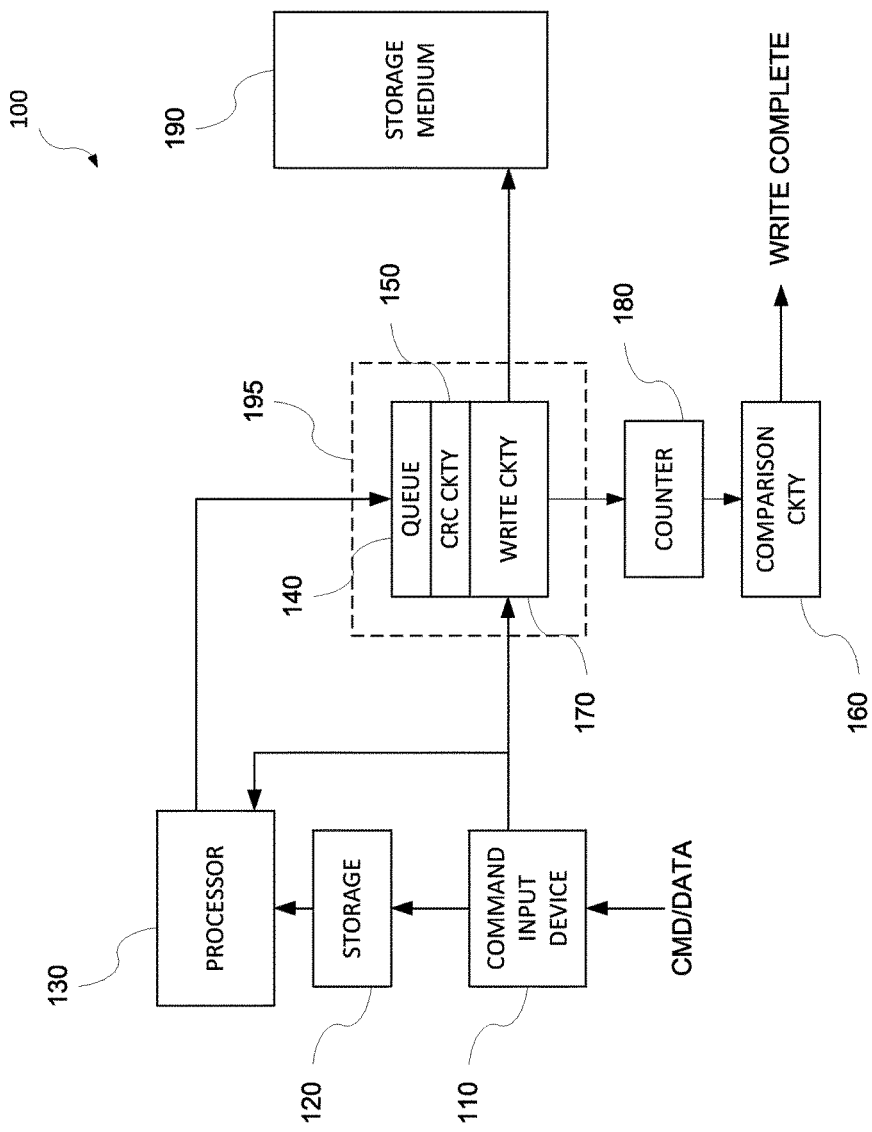
FIG. 1 is a block diagram illustrating a data storage apparatus for writing the same new data in a large number of logical blocks according to an example embodiment of the present inventive concept.

FIG. 1 is a block diagram illustrating a data storage apparatus for writing the same new data in a large number of logical blocks according to an example embodiment of the present inventive concept. Referring to FIG. 1, in one example embodiment of the present inventive concept a data storage apparatus 100 may include a command input device 110, a first temporary storage 120, a processor 130, a second temporary storage 140, cyclic redundancy check (CRC) generation circuitry 150, comparison circuitry 160, write circuitry 170, a counter 180, and a storage medium 190.

Storage medium may include non-volatile memory such as solid-state semiconductor memory (e.g., NAND).

The elements of the data storage apparatus 100 may be integrated on one semiconductor chip or may be separate dies integrated into one semiconductor package. One of ordinary skill in the art will understand that other configurations are possible and are included within the scope of the present inventive concept. For example, the functionalities performed by the described elements may be performed by other elements, and the elements may be combined into fewer elements and/or sub-divided into a greater number of elements.

In one embodiment, the command input device 110 receives a command including a starting logical block address (LBA), a value indicating a range of LBAs, and a logical block of data to be written into the logical blocks within the range of LBAs. For example, the command may be received from a host that is connected to the data storage apparatus 100. The received logical block of data is transferred to the first temporary storage 120. The first temporary storage 120 may be internal or external to the processor 130. The processor 130 duplicates the received logical block of data to generate a logical page with each logical block having the same data as the received logical block of data. For example, for logical page containing eight logical blocks, the processor 130 duplicates the received logical block seven times to generate a logical page containing eight logical blocks each containing the same data.

Each logical block may include, for example but not limited to, about 512 bytes of data, about 1,024 bytes of data, about 2,048 bytes of data, or about 4,096 bytes of data. In some cases, for example when a storage medium is erased or reformatted, the received logical block of data may contain all ones or all zeros, and the value indicating the range of logical block addresses may indicate all of the logical block addresses of the storage medium.

The processor 130 causes the generated logical page to be transferred to the second temporary storage 140. The second temporary storage 140 may be a queue included in a (RMW) module 195. The processor 130 may cause the second temporary storage 140 to be reserved prior to transferring the generated logical page. As shown, the RMW module 195 may additionally include the CRC circuitry 150 and the write circuitry 170.

In one embodiment, the CRC circuitry 150 generates a CRC value based on at least the data and the LBA of each logical block and compares the CRC of the logical block data ready to be written with the CRC of the logical block data as received. If the CRCs do not match, the logical block data to be written is marked invalid. Although CRCs are mentioned in the example embodiments in this disclosure, the use of other error detection mechanisms for example, but not limited to, checksums and hash functions, etc., are possible in some embodiments.

In one embodiment, the write circuitry 170 outputs valid data to the storage medium 190. The counter 180 counts the number of logical blocks written to the storage medium 190 and generates a count value. The comparison circuitry 170 compares the count value to the value indicating a range of LBAs to be written. If the values match, the comparison circuitry 160 generates a signal indicating that the write same operation is complete. In some embodiments, the write same operation is subordinated to other (RMW) operations, so the write circuitry writes the logical page from the second temporary storage into the storage medium as a background task to other write operations involving merging.

In some cases, the first write operation does not begin on a logical page boundary and/or the last write operation does not end on a logical page boundary. In such cases, the (RMW) module 195 performs a RMW operation to modify only the logical blocks specified for the write mask for the corresponding logical page.

In the RMW operation, the generated logical page may be stored in the second temporary storage 140. A second logical page including a plurality of blocks is retrieved from the storage medium 190 by the RMW module 195. Sectors of the generated logical page and second logical page are merged via a plurality of data paths and multiplexers to generate a merged output logical page. In addition, a CRC for the merged output logical page is generated by calculating and accumulating on a block-by-block basis CRC data of the generated logical page and second logical page blocks merged to generate the merged output logical page.

The blocks of at least one of the generated logical page and second logical page are reconstructed into a check-data logical page as the merged output logical page is being generated. Alternatively, both of the generated logical page and second logical page may be reconstructed into check-data logical pages as the merged output logical page as being generated.

A CRC is calculated and accumulated on a block-by-block basis for the check-data logical page, and an error check is performed on the at least one check-data logical page comprising blocks corresponding to those of the generated logical page and second logical page to verify the corresponding blocks of the merged output logical page. Since at least some of the blocks in the check-data logical page are transmitted on a subset of the plurality of data paths that transmits blocks of the merged output logical page, the error check of the at least one check-data logical page verifies the blocks from the at least one check-data logical page in the merged output logical page. In one example embodiment, the error check of both check-data logical pages verifies the blocks of the first and second check-data logical pages in the merged output logical page.

In one embodiment, the RMW module is further configured to calculate a data integrity field for each block and insert the calculated data integrity field between the blocks. Protection schemes for preventing data integrity errors during data transfer are defined by the ANSI T10 Data Integrity Feature (T10 DIF) standard. T10 DIF provides a way to check the integrity of data read and written from a host bus adapter to the disk and back through the storage area network (SAN) fabric. This check is implemented through a data integrity field (DIF) defined in the T10 standard.

Figure 2:
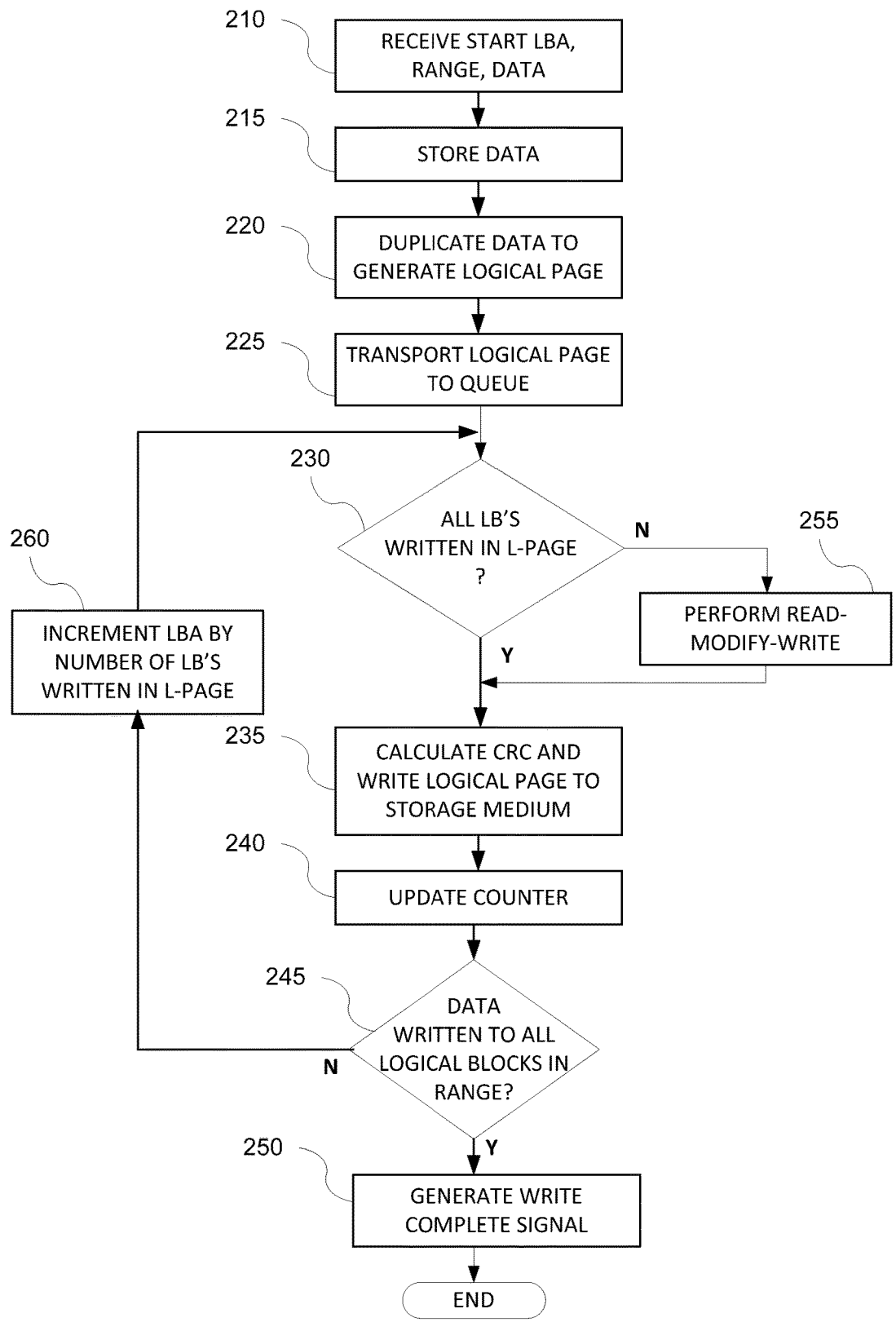
FIG. 2 is a flowchart illustrating a method for implementing a write-same operation according to an example embodiment of the present inventive concept.

FIG. 2 is a flowchart illustrating a method for implementing a write-same operation according to an example embodiment of the present inventive concept. Referring to FIG. 2, a command comprising a starting logical block address, a value indicating a range of logical block addresses to be written, and a logical block of data is received (210). The logical block of data is transferred to a first temporary storage and stored (215). The first temporary storage may be memory internal to a processor or may be other memory integrated on the semiconductor chip. A logical page is generated by duplicating the logical block of data stored in the first temporary storage a number of times corresponding to the number of logical blocks contained in a logical page, for example eight logical blocks (220). The logical page thus generated is transported to a second temporary storage, for example, a queue (225).

A determination is made whether the first logical block address of the duplicated logical page begins at a logical page boundary of a current logical page or if the last logical block address of the duplicated logical page ends at a logical page boundary of a current logical page (230). If so (230-Y), a CRC is calculated as described above in the logical pages written to the storage medium (235). If the first logical block address of the duplicated logical page does not begin at a logical page boundary of a current logical page, or the last logical block address of the duplicated logical page does not correspond to a last logical block address of a current logical page (230-N), a RMW operation is performed to merge the corresponding logical blocks of the duplicated logical page into the current logical page (255).

After the logical page is written to the storage medium, the counter is updated with the number of blocks in the range of logical block addresses written (240). If the value in the counter does not equal the number of logical blocks in the range of logical block addresses to be written (245-N), the LBA is incremented by the number of logical blocks, in the range of logical block addresses, that are written in the current logical page (260), and the process repeats from operation 230. If all the blocks in the range of logical block addresses to be written have been written (245-Y) a write complete signal is generated (250) in the process ends.

Skip Write

Figure 3:
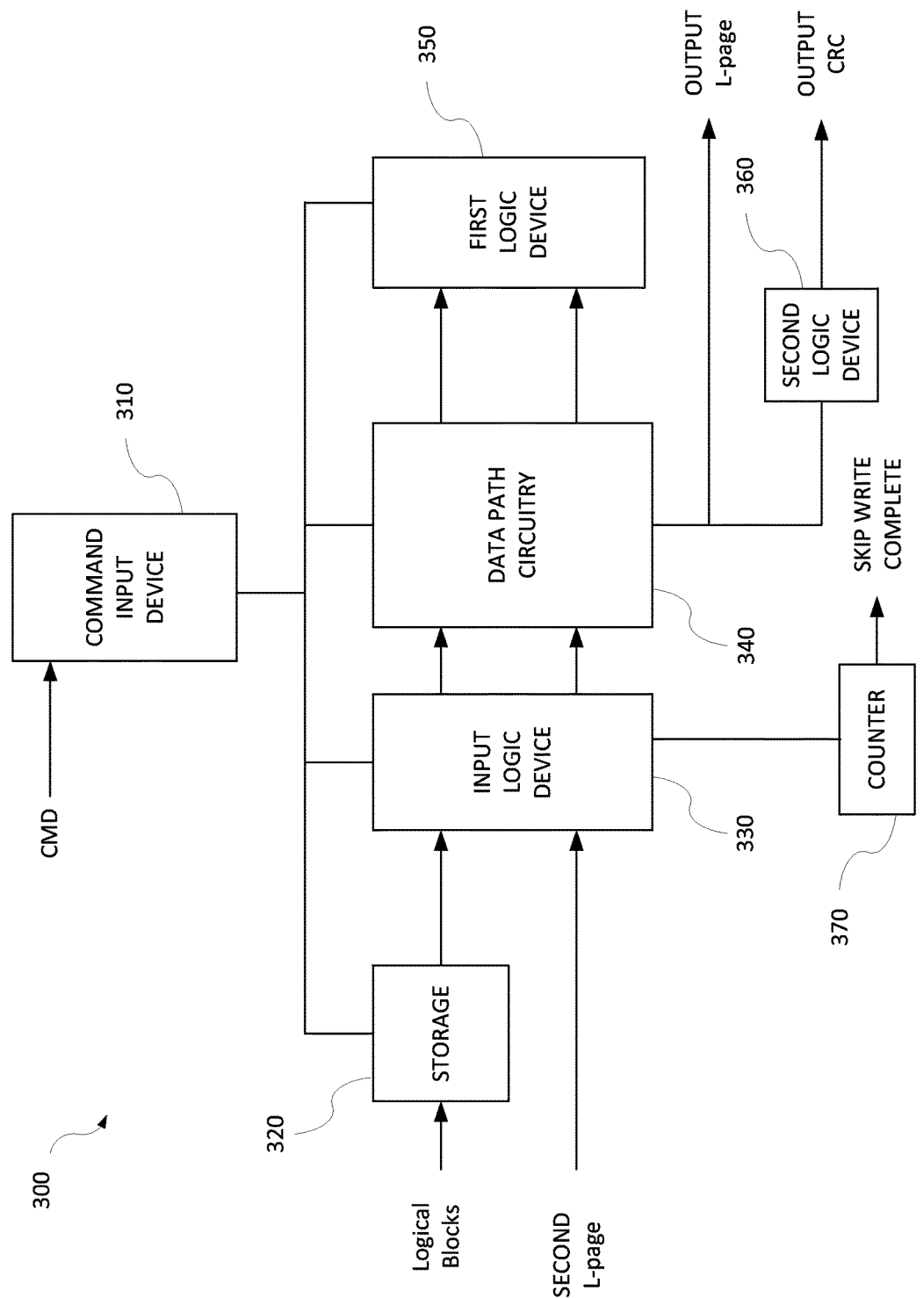
FIG. 3 is a block diagram illustrating a data storage apparatus for performing a skip-write operation according to an example embodiment of the present inventive concept.

FIG. 3 is a block diagram illustrating a data storage apparatus for performing a skip-write operation according to an example embodiment of the present inventive concept. Referring to FIG. 3, in one example embodiment of the present inventive concept a data storage apparatus 300 may include a command input device 310, a storage 320, input logic device 330, multiplexers 340, a first logic device 350, a second logic device 360, and a counter 370.

The elements of the data storage apparatus 300 may be integrated on one semiconductor chip or may be separate dies integrated into one semiconductor package. One of ordinary skill in the art will understand that other configurations are possible and are included within the scope of the present inventive concept. For example, the functionalities performed by the described elements may be performed by other elements, and the elements may be combined into fewer elements and/or sub-divided into a greater number of elements.

The command input device 310 receives a command including a starting logical block address (LBA), a value indicating a range of LBAs, and a write mask. The write mask specifies LBAs of logical blocks into which logical blocks containing different data will be merged. The new logical blocks associated with the command are received and stored in temporary storage 320. Each logical block may include, for example but not limited to, about 512 bytes of data, about 1,024 bytes of data, about 2,048 bytes of data, or about 4,096 bytes of data.

In one embodiment, the input logic device 330 divides the write mask into portions corresponding to a number of logical blocks comprising a logical page and constructs a first logical page based on a corresponding portion of the write mask. For example, for logical pages containing eight logical blocks, the write mask is divided into portions each containing eight bits as merge indicators associated with LBAs.

FIG. 5A is a diagram illustrating a write mask according to an example embodiment of the present inventive concept. Referring to FIG. 5A, the write mask contains 2,048 bits, each bit corresponding to an LBA beginning with the starting LBA received with the command. As an example, FIG. 5A illustrates a starting LBA of '8' and an ending LBA of '2055'. Bits zero, two, and three of the write mask are set to '1' indicating that new logical blocks will be inserted at the corresponding LBAs. The LBAs of the logical blocks to be merged may be consecutive or nonconsecutive.

FIG. 5B is a diagram illustrating a write mask divided into portions corresponding to a number of logical blocks contained in a logical page according to an example embodiment of the present inventive concept. As illustrated in FIG. 5B, for logical pages containing eight LBAs the write mask is divided into 256 portions each containing eight bits corresponding to the LBAs in a logical page. In the portion corresponding to the first logical page, logical blocks corresponding to LBAs 8, 10, and 11 will be replaced by inserting logical blocks associated with the received command into the logical page at those LBAs. One of ordinary skill in the art will appreciate that this example is merely to enhance understanding and is applicable to other configurations of logical pages, logical blocks, and LBAs.

In one embodiment, the input logic device 330 constructs the first logical page and retrieves a second logical page from a storage medium, for example storage medium 190 illustrated in FIG. 1, and verifies CRCs contained in the headers of each logical page. It must be noted that although CRCs are mentioned in the example embodiments in this disclosure, the use of other error detection mechanisms for example, but not limited to, checksums and hash functions, etc., are possible in some embodiments. Also, in some embodiments, the CRC verification may be performed elsewhere in the apparatus. The first and second logical pages are transferred block-by-block from the input logic device 330 in synchronization with the system clock to the data path circuitry 340 where the sectors of the first and second logical pages are merged at about the same speed as the system clock speed based on a corresponding portion of the write mask.

In one example embodiment, the first logical page is stored until a second logical page is retrieved. The second logical page is passed through the Skip Write apparatus 300 block-by-block at about the system clock speed and is merged with the stored first logical page. The first and second logical pages are processed by the first logic device 350 to determine whether the merged output logical page is valid.

Figure 6:
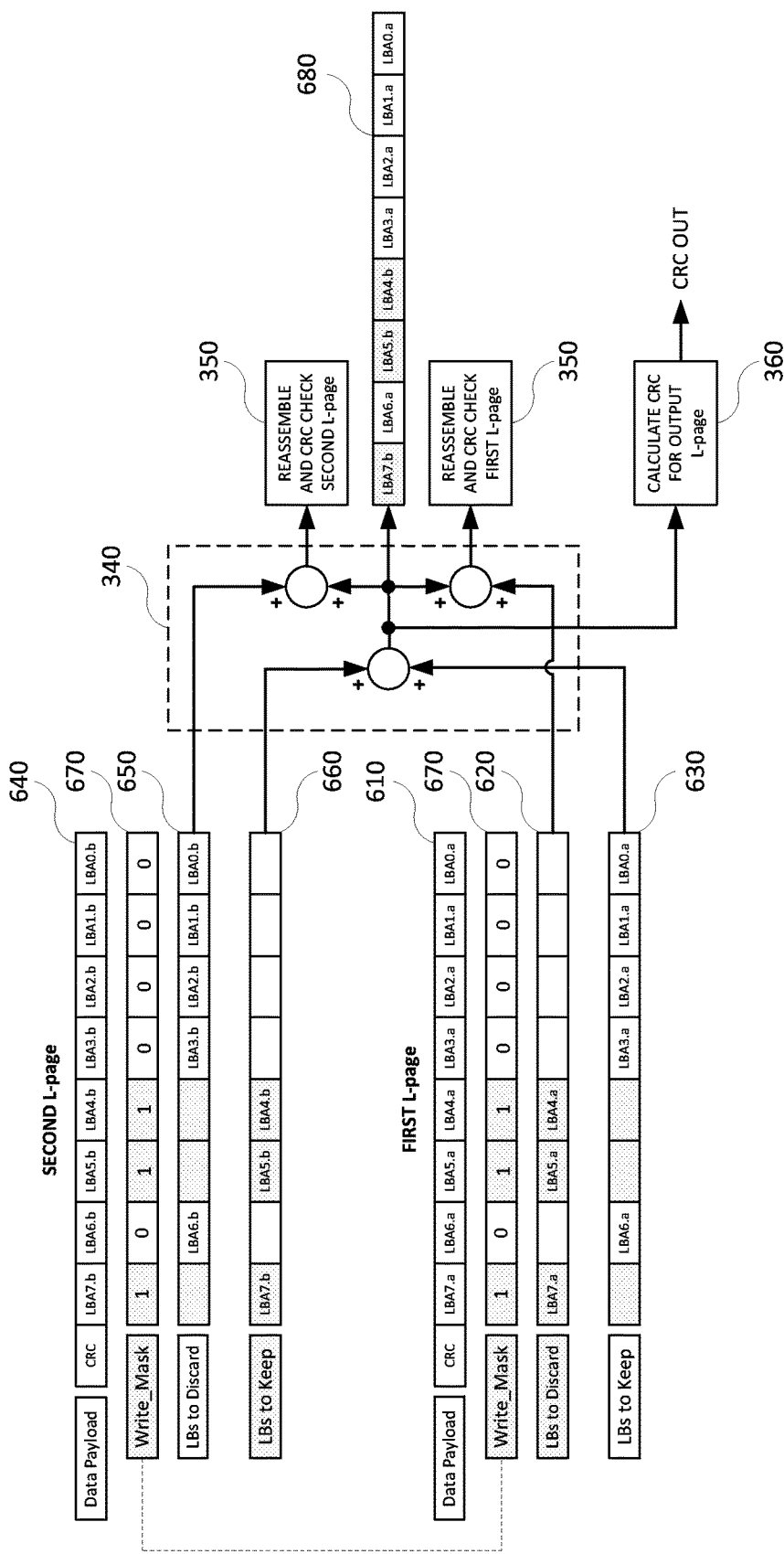
FIG. 6 is a diagram illustrating a method of merging of a first logical page and a second logical page using a corresponding portion of a write mask according to an example embodiment of the present inventive concept.

FIG. 6 is a diagram illustrating merging of a first logical page and a second logical page using a corresponding portion of a write mask according to an example embodiment of the present inventive concept. In the example illustration of FIG. 6, the write mask indicates a logical block to merge into the output logical page with a "1" and a logical block to discard with a "0" with respect to the second logical page, and indicates a logical block to merge into the output logical page with a "0" and a logical block to discard with a "1" with respect to the first logical page. One of ordinary skill in the art will understand that the designations "1" and "0" are merely exemplary and that other designations are possible without departing from the scope of the inventive concept.

Referring to FIG. 6, a corresponding portion of a write mask 670 specifies logical blocks of the second logical page 640 which will be merged with logical blocks of the first logical page 610 in place of logical blocks of the first logical page 610 which will be discarded (shown as LBs to discard 620). Logical blocks of the second logical page 640 which are not specified to merge into the output logical page by the corresponding portion of the write mask 670 are discarded (shown as LBs to discard 650) while logical blocks of the second logical page 640 which are specified to merge into the output logical page by the corresponding portion of the write mask 670 (shown as LBs to keep 660) are merged with the first logical page 610 to generate a merged output logical page 680.

Conversely, logical blocks of the first logical page 610 which are not specified to merge into the output logical page by the corresponding portion of the write mask 670 are discarded (shown as LBs to discard 620) while logical blocks of the first logical page 610 which are specified to merge into the output logical page (shown as LBs to merge 630) by the corresponding portion of the write mask 670 are merged with the logical blocks to merge 660 of the second logical page 640 to generate the merged output logical page 680. In other words, logical blocks of the first logical page specified by the corresponding portion of the write mask are replaced by corresponding logical blocks of the second logical page in order to generate the merged output logical page and the unused sectors of the first and second logical pages are discarded.

While the above merge operations are described in terms of specified logical blocks of the second logical page which may be merged with logical blocks of the first logical page, one of ordinary skill in the art will appreciate that the scope of the present inventive concept also includes merging specified logical blocks of the first logical page with logical blocks of the second logical page. Also, while illustrated as such in FIG. 6, the number of logical blocks in the plurality of logical blocks of the first logical page and the second logical page may not be identical.

Referring again to FIG. 3, in one example embodiment the second logic device 360 calculates and accumulates a CRC for the merged output logical page. Each logical block of the merged output logical page is outputted from the Skip Write apparatus 300 on a block-by-block basis. Generation of the merged output logical page is performed at about the same speed as the system clock speed.

In one example embodiment, the first logic device 350 reconstructs the first and second logical pages as first and second check-data pages, respectively, and the CRCs of the check-data pages are calculated and accumulated by the first logic device 350 on a block-by-block basis. The first check-data page may include logical blocks that are transmitted on a first subset of data paths different from a subset of data paths that logical blocks of the first logical page merged into the output logical page are transmitted on, and the second check-data page may include logical blocks that are transmitted on a second subset of data paths different from the subset of data paths that logical blocks of the second logical page merged into the output logical page are transmitted on.

After processing the last logical block of the first and second logical pages, the CRC of the first logical page is transmitted to the first logic device 350. Simultaneously, the CRC of the second logical page is transmitted to the first logic device 350.

In one example embodiment, the first logic device 350 performs an error check by comparing the transmitted CRC of the first logical page to the CRC calculated for the first check-data page and compares the transmitted CRC of the second logical page to the CRC calculated for the second check-data page. If the received logical page CRCs matches the CRCs of the check-data pages, the merged output logical page will be valid since logical blocks of the merged output logical page passed through the same logic as the logical blocks of the check-data pages and no errors were introduced. If the CRCs do not match, a message is generated indicating that the merged output logical page is invalid. The validity can be verified this way because at least some of the logical blocks in the check-data page are transmitted on a subset of the plurality of data paths that also transmits logical blocks of the merged output logical page, so that the error check of the at least one check-data page verifies the merged output logical page. The use of output data from the actual merged logical page as part of the calculation of the check-data page CRC ensures that any error introduced along the path of the logical page merging mechanism is detected.

Concurrently with the generation of the merged output logical page, the second logic device 360 generates a CRC for the merged output logical page on a block-by-block basis. After the final logical block of the merged output logical page is outputted, the CRC generated by the second logic device 360 for the merged output logical page is outputted.

In a case where the values of a logical page portion of the write mask are all ones, the second logical page is outputted as the output logical page without being merged. Conversely, in a case where a logical page portion of the write mask values are all zeros, no logical page is outputted and the corresponding logical page data stored in the storage medium is not changed.

Referring again to FIG. 3, the counter 370 is incremented based on the number of logical blocks written to the storage medium. The value on the counter 370 is compared to the value of the LBA range received in the command and if the counter value matches the LBA range the counter 370 generates a signal indicating that the skip write process is complete.

Figure 4:
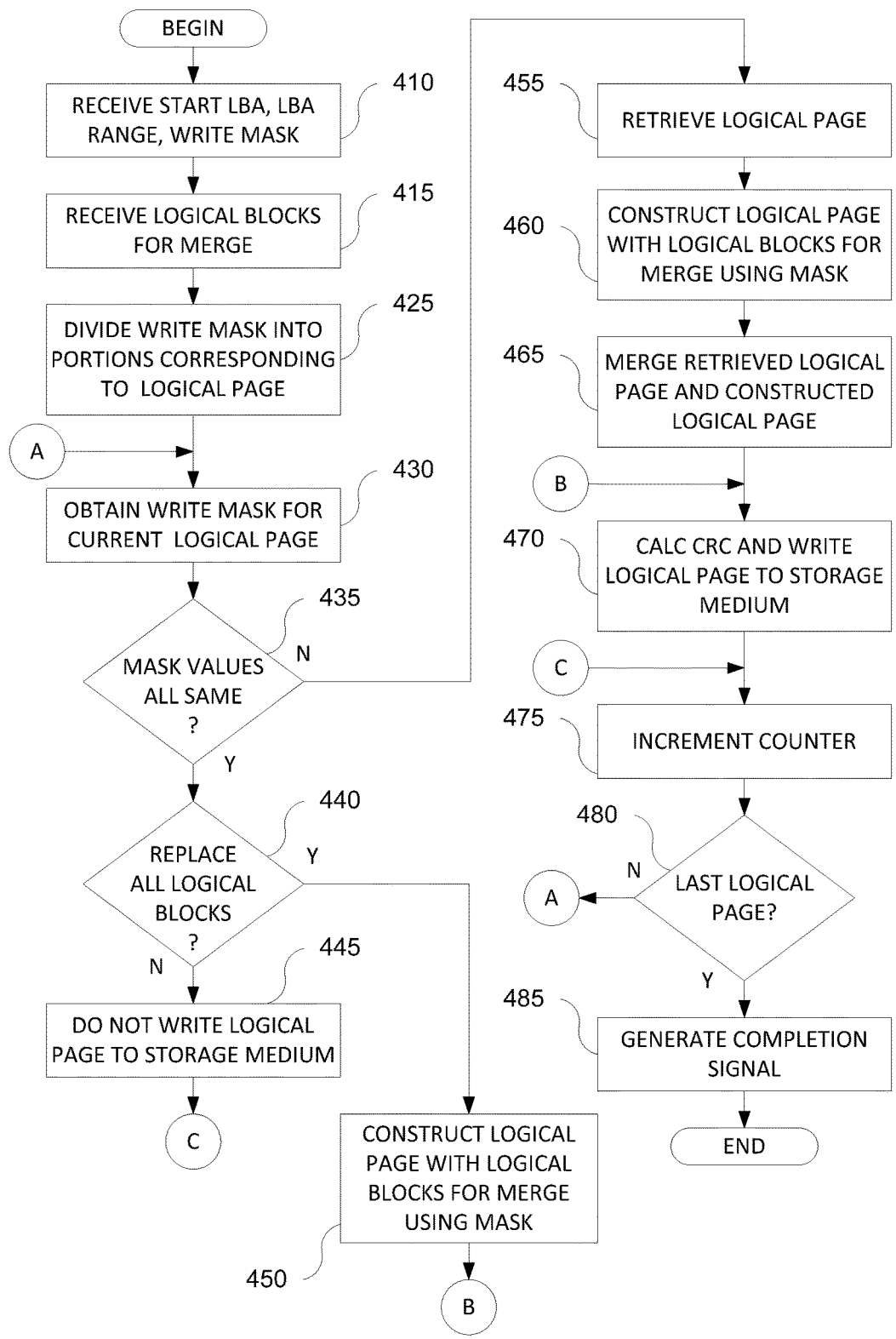
FIG. 4 is a flowchart illustrating a method of implementing a skip-write operation according to an example embodiment of the present inventive concept.

FIG. 4 is a flowchart illustrating a method of implementing a skip-write operation according to an example embodiment of the present inventive concept. Referring to FIG. 4, a command including a starting logical block address (LBA), a value indicating a range of LBAs, and a write mask is received (410). New logical blocks associated with the command are received and stored in temporary storage (415). The write mask is divided into portions corresponding to a number of logical blocks comprising a logical page (425), and a portion of the write mask corresponding the current logical page is obtained (430).

If the values in the corresponding portion of the write mask are all the same (435-Y), either new data will be written in all of the LBAs in the logical page corresponding to that portion of the write mask, for example all bits in the corresponding portion of the write mask are set to '1', or no new data needs to be written in the logical page, for example all bits in the corresponding portion of the write mask are set to '0'. In the case where new data will be written in all of the LBAs in the logical page (440-Y), a first logical page is constructed using the received logical blocks associated with the command (450). A CRC is calculated for the logical page thus constructed and the logical page is written to the storage medium (470). The counter is incremented based on the number of LBAs processed (475). The value on the counter is compared to the value of the LBA range received in the command (480), and if the counter value matches the LBA range (480-Y), the counter generates a signal indicating that the skip write process is complete (485). Otherwise, the process returns to operation 430.

In the case where no new data needs to be written in the logical page (440-N), no write operation to the storage medium takes place (445). The counter is incremented based on the number of LBAs processed (475). The value on the counter is compared to the value of the LBA range received in the command (480), and if the counter value matches the LBA range (480-Y), the counter generates a signal indicating that the skip write process is complete (485). Otherwise, the process returns to operation 430.

In the case where all the write mask values are not the same (435-N), a second logical page is retrieved (455), and a first logical page is constructed using the received logical blocks associated with the command based on a corresponding portion of the write mask (460). The first and second logical pages are merged with a RMW operation as described above (465). A CRC is calculated for the logical page thus constructed and the logical page is written to the storage medium (470). The counter is incremented based on the number of LBAs processed (475). The value on the counter is compared to the value of the LBA range received in the command (480), and if the counter value matches the LBA range (480-Y), the counter generates a signal indicating that the skip write process is complete (485). Otherwise, the process returns to operation 430.

Operations of the present inventive concept may be performed in the order described, in a different order, or operations may be combined. One of ordinary skill in the art will appreciate that the foregoing processes are exemplary and that other variations are possible without departing from the inventive concept.

While certain embodiments have been described, these embodiments have been presented by way of example only, and are not intended to limit the scope of the protection. The methods and apparatuses described herein may be embodied in a variety of other forms. Various omissions, substitutions, and/or changes in the form of the example methods and apparatuses described herein may be made without departing from the spirit of the protection.

The accompanying claims and their equivalents are intended to cover such forms or modifications as would fall within the scope and spirit of the protection. For example, the example apparatuses and methods disclosed herein can be applied to solid-state drives, hard disk drives, hybrid hard drives, and the like. In addition, other forms of storage, for example, but not limited to, DRAM or SRAM, battery backed-up volatile DRAM or SRAM devices, EPROM, EEPROM memory, etc., may additionally or alternatively be used. As another example, the various components illustrated in the figures may be implemented as software and/or firmware on a processor, ASIC/FPGA, or dedicated hardware. Also, the features and attributes of the specific example embodiments disclosed above may be combined in different ways to form additional embodiments, all of which fall within the scope of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of merging logical pages of data, the method comprising:
   receiving a command comprising a starting logical block address, a value indicating a range of logical block addresses, and a write mask;
   receiving a first plurality of logical blocks associated with the command;
   dividing the write mask into portions corresponding to a number of logical blocks comprising a logical page;
   obtaining a portion of the write mask corresponding to a current logical page;
   constructing a first logical page based on the corresponding portion of the write mask using the first plurality of logical blocks; and
   retrieving from a storage medium a second logical page comprising a second plurality of logical blocks;
   generating a merged output logical page by merging logical blocks of the second logical page with logical blocks of the first logical page based on a corresponding logical page portion of the write mask beginning from the starting logical block address.

2. The method of claim 1, wherein if the values of a logical page portion of the write mask are all ones, the second logical page is outputted as the output logical page without being merged.

3. The method of claim 1, wherein if the values of a logical page portion of the write mask are all zeros, no logical page is outputted.

4. The method of claim 1, wherein the merging is performed over a plurality of data paths comprising a plurality of multiplexers.

5. The method of claim 1, wherein the write mask indicates for the range of logical block addresses beginning at and indexed from the starting logical block address which logical blocks of the first and second logical pages are to be merged into the output logical page.

6. The method of claim 5, wherein each logical page comprises a predetermined number of logical blocks; and additional first logical pages are constructed based on corresponding logical page portions of the write mask and additional second logical pages are retrieved from the storage medium and a plurality of merged output logical pages is generated by merging corresponding first and second logical pages based on the range of logical block addresses and the predetermined number of logical blocks comprising a logical page.

7. The method of claim 5, wherein the addresses of the logical block to be merged are non-consecutive.

8. The method of claim 1, further comprising generating a cyclic redundancy code (CRC) for the merged output logical page by accumulating CRC data of the logical blocks merged into the output logical page on a block-by-block basis.

9. An apparatus for merging logical pages of data, the apparatus comprising:
   a command input device configured to receive a command comprising a starting logical block address, a value indicating a range of logical block addresses, and a write mask;
   a temporary storage configured to receive and store a first plurality of logical blocks associated with the command;
   an input logic device configured to receive the first plurality of logical blocks associated with the command from the temporary storage and retrieve from a storage medium a second logical page comprising a second plurality of logical blocks, divide the write mask into portions corresponding to a number of logical blocks comprising a logical page, and construct a first logical page based on a corresponding portion of the write mask using the first plurality of logical blocks; and
   data path circuitry comprising a plurality of data paths comprising a plurality of multiplexers, the circuitry configured to generate, using the plurality of data paths, a merged output logical page by merging, beginning from the starting logical block address, logical blocks of the second logical page with logical blocks of the first logical page based on a corresponding logical page portion of the write mask.

10. The apparatus of claim 9, wherein if the values of a logical page portion of the write mask are all ones, the second logical page is outputted as the output logical page without being merged.

11. The apparatus of claim 9, wherein if the values of a logical page portion of the write mask are all zeros, no logical page is outputted.

12. The apparatus of claim 9, further comprising a logical block counter configured to count a number of logical blocks processed beginning from the starting logical block address up to the value indicating the range, wherein the logical block counter generates an indication signal when the count value matches the logical block address range value received in the command.

13. The apparatus of claim 9, wherein the write mask indicates for the range of logical block addresses beginning at and indexed from the starting logical block address which logical blocks of the first and second logical pages are to be merged into the output logical page.

14. The apparatus of claim 13, wherein each logical page comprises a predetermined number of logical blocks; and additional first logical pages are constructed based on corresponding logical page portions of the write mask and additional second logical pages are retrieved from the storage medium and a plurality of merged output logical pages is generated by merging corresponding first and second logical pages based on the range of logical block addresses and the predetermined number of logical blocks comprising a logical page.

15. The apparatus of claim 13, wherein the addresses of the logical blocks to be merged are non-consecutive.

16. The apparatus of claim 13, wherein the addresses of the logical blocks to be merged are consecutive.

17. The apparatus of claim 9, further comprising a second logic device configured to generate a cyclic redundancy code (CRC) for the output logical page by accumulating CRC data of the logical blocks merged into the output logical page on a block-by-block basis.

* * * * *